Aug. 23, 1966    B. B. YOUNG    3,268,804
ELECTRODE CARRIER DELAY RELEASE MECHANISM IN A SYSTEM
FOR DETERMINING THE COAGULATION PROPERTIES OF BLOOD
Filed April 18, 1962    2 Sheets-Sheet 2
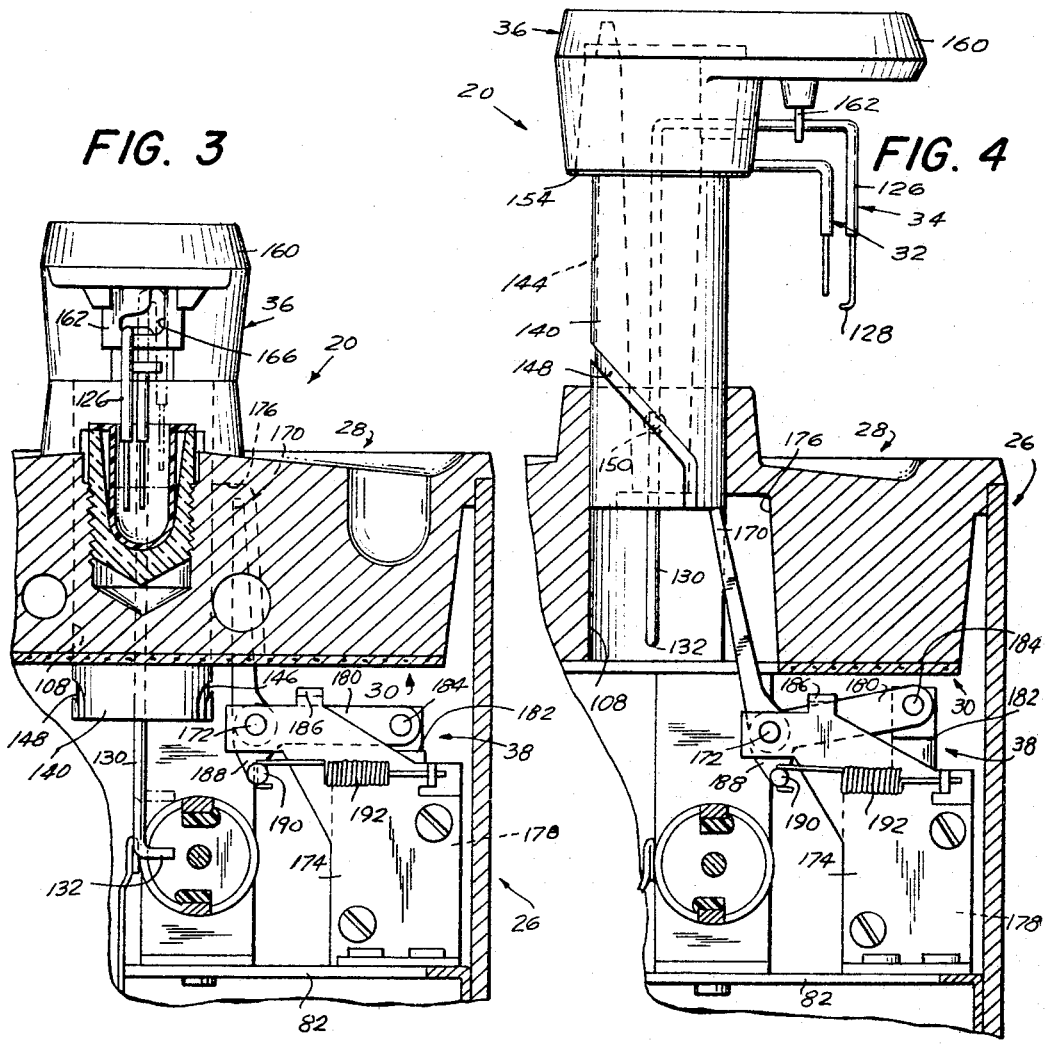
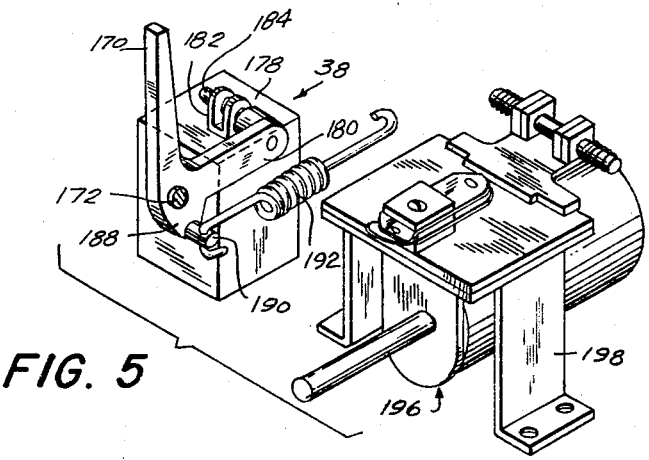
INVENTOR.
BRUCE B. YOUNG
BY
Kane, Dalsimer and Kane
ATTORNEYS United States Patent Office 3,268,804
Patented August 23, 1966

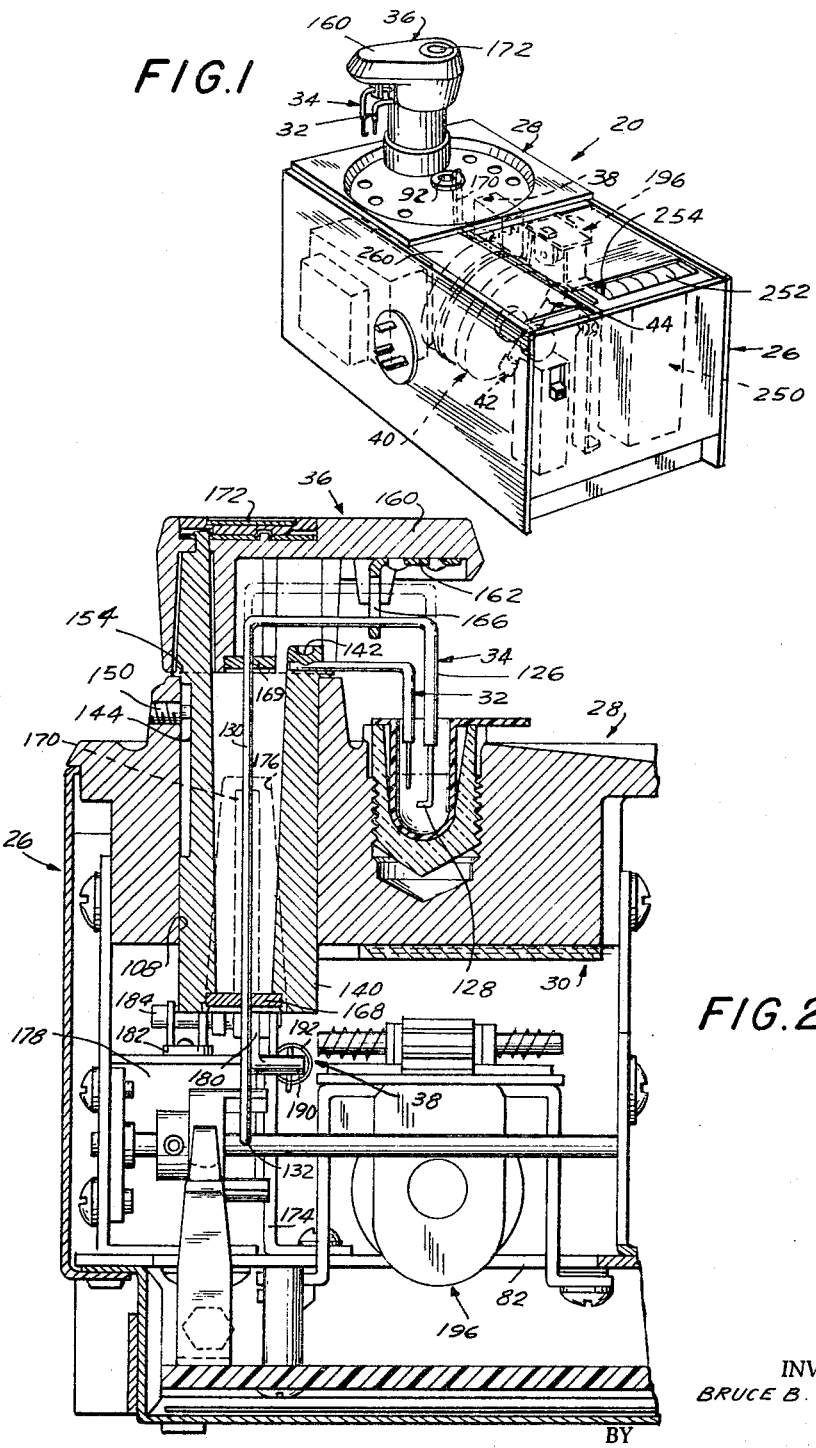

3,268,804
ELECTRODE CARRIER DELAY RELEASE MECHANISM IN A SYSTEM FOR DETERMINING THE COAGULATION PROPERTIES OF BLOOD
Bruce B. Young, Radnor, Pa., assignor to Becton, Dickinson and Company, Rutherford, N.J., a corporation of New Jersey
Filed Apr. 18, 1962, Ser. No. 188,355
1 Claim. (Cl. 324—30)

The present invention relates to an electrode carrier delay release mechanism for use in a system for determining certain characteristics of a liquid material and, more particularly, for use in a system for measuring prothrombin times and coagulation properties of blood for purposes of determining the characteristics of the hemostatic mechanism.

It should be understood initially that this invention has wider application to the field of liquid resistivity and conductivity determinations of the presence of certain bodies in liquids, and fibrillation per se. As an illustrative embodiment, this disclosure will be devoted primarily to hemostosis, and is particularly applicable to a timer apparatus and system of the type contained in companion and commonly assigned patent application filed in the name of Phyllis D. Page and Bruce B. Young and entitled, "Coagulation Timer," filed on even date herewith and assigned Serial No. 188,934.

The objects and advantages of the present invention are provided by an electrode carrier release mechanism adapted to constitute part of an electro-mechanical instrument for measuring the coagulation properties of plasma in diagnostic and therapeutic control. These measurements are often in terms of prothrombin times. It should be understood, however, that this invention is not necessarily limited to this field and has wider application and utility as, for example, in measuring the resistive and conductivity properties of liquids as well as their capabilities to initiate the process of fibrillation.

Briefly stated, the invention is incorporated in a timer having a casing of relatively reduced size, whereby the over-all unit is readily portable, light-weight, compact, and miniature, yet effectively operated with efficiency; a heater block is mounted by the casing and is formed with a number of wells for receiving test tubes containing either patient's or control plasma or selected chemical reagents for carrying out the coagulation process. The block additionally includes a reaction well which receives a test tube wherein the particular plasma is reacted with the selected reagent.

A binary heating system that is thermostatically controlled serves to heat the block to the desired temperature and maintain it at this point within preset limits. In prothrombin time determinations, the temperature ordinarily selected is that of the normal body temperature, notably 37° C.

A pair of electrodes are suspended from a probe carrier assembly which is adapted to assume a rest position at which the electrodes are retracted laterally to one side of the reaction well, and an immersed position. In this position the electrodes are in the specimen of liquid to be tested and measured in the reaction well. One of the electrodes is adapted to be stationary with respect to the probe arm of this assembly whereas the other electrode is movable relative thereto. In this connection the movable probe is adapted to define a certain path of travel into and out of the specimen of liquid within the reaction well to facilitate sensing and detection.

The electrode carrier delay release mechanism of this invention serves to releasably lock or latch the probe arm in its rest position until such time as it is desirable to initiate the test cycle. When the operation of the timer is initiated, the probe carrier assembly, however, will not be released until the expiration of a predetermined time interval in order to permit the instrument attendant or operator to remove all possible obstacles from the path of fall or descent of the probe arm and its suspended electrodes.

A solenoid is included in the carrier release mechanism and, when energized, retracts a solenoid arm which has been maintaining or latching the probe carrier in its rest position. Under these circumstances the probe carrier descends. Projecting surfaces of the heater block cooperate with a spiral-shaped groove or raceway in order that the probes may be directed from their rest position into the reaction well containing the specimen to be tested.

A motor having the usual output shaft is mounted within the timer casing and serves to move the movable electrode into and out of the specimen being tested, so that it is sufficiently agitated and the end point for the property being measured may be readily detected. In the case of time measurements of fibrillation initiation in a liquid specimen having such properties, the movable electrode will, in time, lift a fiber or network of fibers out of the liquid specimen. When this occurs, the desired end point of the test operation has been reached.

A timing means for registering the end point of the measurement being taken is also incorporated in the casing. This timing means may assume the form of a digital read-out which may be pulsed synchronously with the rotation of the output shaft of the motor.

A timer bar assembly serves to initiate the operation of the timer. A cut-out means is also provided whereby the operation of the timer and the movement of the movable probe is stopped by deactivating the motor. If the initiation of fibrillation is being conducted as the measurement and the liquid specimen being tested is blood or its plasma mixed with a reagent, the cut-out means acts upon the sensing and detecting of fibrin from the liquid specimen or sample by the movable probe. In this connection an electrical potential is applied across the electrodes. In the event fibrin of the blood sample is lifted out of the mixture by the movable probe, an electrical current path is thusly provided between the electrodes through the fibrin and blood sample. When this current path is provided, an electrical circuit is shorted whereby the motor is de-energized thereby stopping the digital read-out and movement of the movable probe. In prothrombin time determinations, the measurement is thus made and the time registered by the digital read-out is read and recorded. Under such circumstances it will be possible to determine the proper diagnostic and therapeutic control.

Other objects and advantages will become apparent from the following detailed description, which is to be taken in conjunction with the accompanying drawings illustrating a somewhat preferred embodiment of the invention and in which:

FIG. 1 is a perspective view of a timer incorporating the electrode carrier delay release mechanism of the present invention;

FIG. 2 is an enlarged fragmentary elevational view in section showing this mechanism in the timer;

FIG. 3 is a fragmentary sectional view of the carrier release mechanism in an unlatched position at which the carrier is permitted to assume an electrode-immersed position;

FIG. 4 is a similar fragmentary elevational view in section showing the release mechanism in a latched position at which the carrier is supported in an electrode-elevated position; and FIG. 5 is an exploded perspective view of the electrode carrier delay release mechanism with associated time delay means.

The timer to which the electrode carrier delay release mechanism of this invention pertains is adapted to measure properties and characteristics of an electrical resistive medium and has particular application to the detection of the presence of a resistive body in liquids. In accordance with an exemplary embodiment, the timer incorporating the present invention contemplates the detection of the presence of fibers or similarly conformed matter in liquids, particularly the initiation of fibrillation in such liquids. With this in mind as an illustrative application, the detailed description and disclosure will be directed to the detection of fibers or fibrin during the coagulation or clotting process of blood.

In the drawings (with specific reference to FIG. 1) an electro-mechanical instrument or apparatus 20 utilizing the electrode carrier delay release mechanism of this invention automatically measures the coagulation properties of plasma in diagnostic and therapeutic control. This instrument is based on the time-tested, manual technique adapting the basic action of a trained technician manipulating a wire loop for sensing the initial clot formation. The coagulation timer 20 is designed to form part of a modular system for investigating and measuring the coagulation properties of blood. Thus, the timer 20 may be a modular unit of a system which may include a centrifuge utilized for purposes of separating the constituents of whole blood into the component parts. More specifically, the centrifuge may separate whole blood into pure plasma and isolate this constituent from the remainder. The plasma thus obtained may then be reacted with a suitable reagent to determine prothrombin times by the timer 20.

The timer 20 will include a casing 26 which mounts, among other units, a heating block 28 for receiving, as well as transferring, heat to the individual liquids and their reaction mixtures to be described in detail shortly. A binary, thermostatically controlled heating means 30 (FIGS. 2, 3 and 4) is associated with the block 28 for purposes of raising it to the selected standard operating temperature and maintaining it at this point within very narrow limits. A pair of electrodes 32 and 34 are suspended from a probe carrier assembly 36 such that in one position the electrodes are at rest away from the reaction mixture to be tested (see FIGS. 1 and 4), and in a second position at which the electrodes are operable to detect the initiation of fibrillation (see FIGS. 2 and 3). As will be explained, the electrode 32 is stationary whereas electrode 34 is adapted to be movable into and out of the reaction mixture. A carrier release mechanism 38 serves to releasably lock or latch the probe carrier assembly 36 in its rest position. When this mechanism is actuated, it will release the probe carrier assembly 36 so that the probes 32 and 34 will be in an operable position immersed in the reaction mixture. A drive assembly 40 is interiorly of the casing 26 and performs a number of functions, one of which being to raise and lower the movable probe 34 out of and then into the reaction mixture. Another purpose of the drive means 40 is to actuate a timing mechanism 42 which registers and records the prothrombin times. The starting of the timing means and, for that matter, the initiation of operation of the timer 20, aside from the heating means 30, is regulated by a timer bar assembly 44. In this connection the drive means 40 will be actuated to, in turn, set into operation the timing means 42 and the movement of the movable probe 34 following the descent of the probe carrier assembly 36 after a predetermined time interval as governed by the release mechanism 38. When fibrin is sensed and detected by the movable probe, as will be explored in detail shortly, the drive means 40, and, consequently, the timer 42 and movable probe 34 will cease operation. The end point of the prothrombin time determination has accordingly been reached. This prothrombin time is then read and recorded.

The electrodes 32 and 34, during the operation of the timer 20, are supplied with an electrical potential when the movable electrode 34 is raised above the surface of the liquid in the reaction well 92. When fibrillation, or more particularly, thrombosis, occurs, the fibrin will be sensed and lifted out of the blood specimen by the movable probe 34. At such time, a current path is provided between the electrodes thereby determining the end point of the test.

*Probe carrier assembly*

The probe carrier assembly 36 (FIGS. 2, 3 and 4) serves to properly place the electrodes 32 and 34 in the reaction well 92 when the timer is set in operation. When in non-use or prior to initiation of operation or after an end point has been reached, the probe carrier assumes a rest position at which the electrodes are directed upwardly and to the side away from the reaction well. The probe carrier assembly comprises the tubular carrier 140 which receives, interiorly thereof and in a coaxial relationship, the arm 130 of the movable probe 34. The carrier 140 is peened as at 142 for purposes of anchoring thereto the stationary electrode 32. This carrier 140 is slidably disposed in the bore 108 of the heater block 28 as previously explained. At the rear of the carrier 140 is formed a groove network which includes the longitudinally extending groove sector 144 which extends into bifurcated grooves 146 and 148. A set screw 150 extending from the heating block 28 into this groove network serves to direct the movement of the probe carrier assembly 36 from a raised position to a lowered position at which the probes are in the reaction well and vice versa. The bifurcated groove system permits the raising of the carrier assembly 28 and shifting to either side of the reaction well as desired. Notwithstanding the side to which the carrier assembly is laterally shifted, upon the release of the carrier assembly by the carrier release mechanism 38, the electrodes 32 and 34 will eventually fall into the reaction well 92. The radial flange 154 of the carrier 140 engages the heater block 28 to stop the downward descent of the carrier and probes 32 and 34.

A cap 160 fits neatly over the top of the carrier 140 and is secured thereto in any one of a number of ways, as for example, by peening studs extending upwardly from the carrier through openings in the cap as shown. A strap 162 is suspended from the cap 160 for supporting the movable probe 34 and guiding its sweep. In this connection, the strap 162 will be provided with an opening 166 of such configuration that the traverse of the tube 126 therein will be translated into a corresponding movement of the arm 128. A washer 168 on the carrier 140 and washer 169 on the cap 160 serve to guide the arm 130 through its movements.

A name plate 172 may be secured in a suitably formed recess in the cap 160 if desired.

*Electrode carrier release mechanism*

The electrode carrier release mechanism 38 serves a dual function. Firstly, while in a de-energized state, it is adapted to maintain the electrode carrier 36 in either of its two rest positions. Secondly, in an energized state, it will permit the electrode carrier 36 to descend. The interengagement of the slotted network of the carrier 140 and the set screw 150, will place the electrodes 32 and 34 in the reaction well 92. In accordance with one of the standardized techniques, as previously discussed, 0.2 ml. of reagent is contained in the tube. Then 0.1 ml. of either control or patient's plasma is inserted in the tube containing reagent. In order to enable the attendant or timer operator to remove instruments, fingers and the like from the path of travel of the electrode carrier 36 and electrodes 32 and 34, a time delay is incorporated into the carrier release mechanism 38 before the probes are permitted to descend.

The carrier release mechanism (see FIG. 5) includes a lever 170 pivotally mounted by pin 172 to the bracket 174 suitably anchored to the plate 82. The lever 170 is adapted to assume a release position in which it is disposed in an accommodating recess 176 in the heater block 28, as will be explained, when the solenoid 178 of this mechanism is energized. The lever is also adapted to assume a locked or latched position at which the terminal end of the lever 170 will engage and support the base of the carrier 140. The lever 170 includes a laterally extending integral arm 180. The free end of this arm is pivotally connected with the core 182 of the solenoid 178 by means of the pivot pin 184. The bracket 174 includes an inwardly extending flange 186 which serves as a stop in limiting the upward pivotal movement of the arm 180, and, consequently, the lever 170 about the pivot pin 172. The lever 170 further includes an extension 188 having a transversely extending stud 190 which secures one end of the compression spring 192. The other end of the spring 192 is anchored to the bracket 174. Under these circumstances, the bias of the spring 192 will urge the lever 170 inwardly about the pivot pin 172. Due to the engagement of the upper end of the arm 180 and the inwardly extending flange 186, the upper edge of the lever 170 will come to rest direct under the bottom edge of the carrier 140. Thus, the carrier assembly 28 will be supported in its rest position. As a result of the energization of the solenoid 178, its core 182 will be retracted urging the arm 180 downwardly and, consequently, the lever 170 away from the carrier 140 against the bias of the spring 192. When this occurs, the carrier assembly 36 will be free to fall or drop, placing the electrode 32 and 34 in the reaction well 92. Immediately upon the de-energization of the relay 178 the spring 192 will return the lever 170 to its original carrier holding position. This will be obtained upon the manual lifting of the probe carrier assembly 28, permitting the interengagement of the top edge of the lever 170 and the bottom edge of the carrier 140.

A time delay relay 196 is supported on the plate 82 by means of bracket 198. This relay serves to provide a suitable time delay before the solenoid 178 is energized to permit the release of the electrode carrier 36. In this connection the clinician or attendant will have ample time to remove any instruments or members of the body from the path of travel of the probe carrier assembly 36 particularly the probes 32 and 34. A suitable time delay relay may be obtained commercially as the Heinemann type A, Time Delay Relay, 2 seconds, 115 v./50–60 cycle, S.P.D.T.

Thus, it should be apparent that an effective electro-mechanical instrument is provided by this invention, to measure the properties of liquids, detect certain of their constituents and determine their facility to undergo fibrillation. An important application is in the measurement of coagulation properties of plasma in diagnostic and therapeutic control.

Assuming that the probe carrier is in a rest position and the heating system together with the plasma and reagent are at operating temperatures, aliquots of plasma are blown into the selected thromboplastin reagent in a tube in the reaction well 92. The timer bar 260 is immediately pressed to initiate the mechanical action. The probe carrier 36 automatically swings the probes 32 and 34 over the reaction well after the time delay dictated by the release mechanism 38. The movable electrode 34 alternately descends and lifts to seek and sense initial clot formation.

When the end point occurs the moving electrode 34 and the timer means 250 stop. Prothrombin time, in seconds and tenths is registered on the digital read-out 252. The read-out reset button 254 is pressed; the electrodes cleaned by wiping with ordinary tissue, and the probe carrier 36 repositioned at rest, in readiness for subsequent tests.

In view of the foregoing, the afore-noted objects and advantages are effectively attained. Although a single preferred embodiment of the invention has been disclosed herein, it should be understood that the invention is in no sense limited thereby, but is to be determined by the scope of the appended claim.

I claim:

In a system for determining the coagulation properties of blood wherein said system includes an electrode carrier adapted to lower its electrodes into a specimen of said blood to an electrode-immersed position from a raised electrode-elevated position, and an electrode carrier release mechanism coupled with said electrode carrier, said release mechanism adapted to determine the position of the carrier and comprising a solenoid means and a solenoid arm means, said arm means adapted to engage said electrode carrier and maintain it in said electrode-elevated position, said arm means adapted to disengage said carrier to permit its release to said electrode-immersed position upon the energization of said solenoid means, said mechanism also including a spring biasing means for urging said arm means towards the carrier and away from said solenoid means which, upon energization, attracts said arm means thereto and away from said carrier, and stop means for limiting the movement of said arm means under the influence of said spring biasing means towards said carrier, and said mechanism further including time delay means for delaying the energization of said solenoid means and consequently the lowering of the carrier to the electrode-immersed position until the expiration of a predetermined period of time following the initiation of operation of the system.

References Cited by the Examiner

UNITED STATES PATENTS

| | | | |
|---|---|---|---|
| 2,770,531 | 11/1956 | Hawes et al. | 23—253 X |
| 2,931,977 | 4/1960 | Torstenson et al. | 324—65 |
| 3,020,748 | 2/1962 | Marshall et al. | 73—53 |
| 3,041,146 | 6/1962 | Kuzell | 23—253 |
| 3,127,542 | 3/1964 | Riebs | 317—36 X |

OTHER REFERENCES

Schnitger: German printed application No. 1,022,822, published Jan. 16, 1958.

WALTER L. CARLSON, *Primary Examiner.*

FREDERICK M. STRADER, *Examiner.*

C. F. ROBERTS, *Assistant Examiner.*